United States Patent Office 2,987,510
Patented June 6, 1961

2,987,510
PROCESS FOR THE MANUFACTURE OF POLYVINYL CHLORIDE

Michael Lederer and Hans-Helmut Frey, Frankfurt am Main, and Rudolf Reeber, Hofheim (Taunus), Germany, assignors to Farbwerke Hoechst Aktiengesellschaft vormals Meister Lucius & Bruning, Frankfurt am Main, Germany, a corporation of Germany
No Drawing. Filed Feb. 14, 1958, Ser. No. 715,195
Claims priority, application Germany Feb. 21, 1957
3 Claims. (Cl. 260—92.8)

The present invention relates to a process for the manufacture of polyvinyl chloride.

Vinyl chloride can be polymerized by the emulsion, suspension, solvent and bulk polymerization process. Especially valuable polymers are obtained by the suspension polymerization. When carrying out the polymerization on an industrial scale it is desirable to attain high conversion rates and to obtain as high a space-time yield as possible. It is generally known, however, that conversion rates above 80% give rise to uncontrollable secondary reactions in the polymerization impairing the quality of the polymers.

It is known, for example, that in the processing of suspension polymers of vinyl chloride there occur spots or fish eyes in the rolled films. In the known processes this phenomenon largely depends on the degree of polymerization.

In the manufacture of rolled films of a polyvinyl chloride produced with the use of polyvinyl alcohol as suspension stabilizer with a conversion rate of 40% the fish eyes are quite embarrassing. It results from Table 1 that in a film having a thickness of 0.2 mm. and being rolled for 8 minutes at 150° C. the number of fish eyes is extremely high at low conversion rates (about 2,000 to 3,000 per 100 cm.$^2$). The best values are obtained with conversion rates between 70 and 80%. The number of fish eyes increases with still higher conversion rates.

TABLE 1

| Conversion, percent: | Fish eyes per 100 cm.$^2$ |
|---|---|
| 35 | 2,000–3,000 |
| 70–80 | 6–8 |
| 85 | 150–200 |

Processes are known wherein the formation of fish eyes can be reduced by combining the suspension stabilizers used for the polymerization (for example methyl cellulose) with ionic emulsifiers (U.S. Patent 2,528,469). Said additions prevent the formation of fish eyes, but only with a conversion rate up to 80%.

It is furthermore known to combine the suspension stabilizer used in the polymerization with monoglycerides of saturated fatty acids, for example glycerol monostearate and the like (British Patent 755,796) in order to obtain films having a smaller number of fish eyes. At a high conversion rate, however, the formation of fish eyes in the rolled films is increased.

Now we have found that vinyl chloride can be polymerized by a suspension process up to high conversion rates by adding to the polymerization batch, in addition to the known water-soluble suspension stabilizers, 0.01–1% of an ester obtained from an aliphatic polyhydric alcohol and an unsaturated fatty acid, the acid component containing 12–20 carbon atoms and the amount of the ester being calculated on the monomer.

As aliphatic polyhydric alcohol there may preferably be used glycerol. In case the polyhydric alcohol has more than 2 hydroxyl groups all hydroxyl groups may be esterified or only part of them.

By the step according to the invention it is possible to prepare polyvinyl chloride in an industrially advantageous manner (high conversion rates, for example 95%) without the products prepared therefrom, for example films, having detrimental properties such as the formation of fish eyes.

A further advantage of the process according to the invention consists in the fact that the polymerization takes place very smoothly. It is known that in the polymerization of vinyl chloride a strong increase in conversion takes place when about 40% of the reaction product has been converted, that is to say the polymerization progresses in an autocatalytic manner. At this moment it is absolutely necessary to eliminate more intensively the reaction heat in order to maintain the required polymerization temperature. By the addition of unsaturated monoglycerides said maximum temperature can be completely or largely suppressed.

The use of unsaturated monoglycerides in the polymerization has an especially advantageous effect on the isolation of the polymers since they prevent almost completely the foaming usually occurring in the course of the filtration and the recovery of the monomers.

The compounds used according to the process of the invention in the polymerization process are—as already mentioned—esters of polyhydric aliphatic alcohols, preferably glycerol esters in which one hydroxyl group is esterified with an unsaturated aliphatic acid, the carbon chain of which contains 12–20 carbon atoms and has at least one double bond. As polyhydric alcohols there may be used, for example, those having up to 6 carbon atoms such as glycol, glycerol, erythrite, xylite, sorbitol.

In the case of acids having a plurality of double bonds it is preferable that said double bonds do not stand in conjugation to one another. In addition thereto the acid radical may contain hydroxyl groups. As examples for unsaturated acids of this kind there are mentioned oleic acid, linolic acid, linolenic acid, ricinoleic acid.

The esters mentioned are used in the polymerization process in amounts ranging from 0.01 to 1%, preferably from 0.1–0.5% calculated on the monomer.

The polymerization is carried out by known processes with the use of a suspension stabilizer, for example gelatin, methyl cellulose, polyvinyl alcohol, and of a catalyst soluble in the monomer such as benzoyl peroxide, 2,4-dichlorobenzoyl peroxide, lauroyl peroxide, caprilyl peroxide or azo-diiso-butyronitrile in the presence of water. It is advisable to add the monoglyceride prior to the beginning of the polymerization.

It is likewise possible, however, to operate in a manner such that the polymerization is started in the usual manner and that the monoglyceride is introduced wholly or in portions into the reaction vessel after a certain reaction period.

The polymers produced according to the process of the invention are excellently suitable for the manufacture of films practically free from fish eyes.

The following examples serve to illustrate the invention but they are not intended to limit it thereto; the parts being by weight. Examples 1 and 2 demonstrate the advantages of the process according to the invention as compared to Examples 3 and 4. In Example 3 there is used no glyceride and in Example 4 a saturated glyceride is used in the polymerization.

Example 1

In an autoclave provided with a stirring device there are added to 190 parts of water 0.4 part of polyvinyl alcohol, 0.5 part of isobutyl-naphthalene-sulfonic acid sodium, 0.3 part of lauroyl peroxide, 0.12 part of glycerol-mono-oleate and 100 parts of vinyl chloride. The polymerization is carried out at 54° C. and takes place very smoothly. Only small amounts of frigorific energy are required and the reaction temperature does not show a maximum. After 16 hours 88% of a fine-grained polymer are obtained. From 70 parts of said polymer, 30 parts of dioctyl phthalate and 1% of a stabilizer a film 0.2 mm. thick is produced on the roller at 150° C. After a rolling time of 8 minutes, the film has 8 fish eyes per 100 cm.$^2$.

*Example 2*

Instead of the monoglyceride used in Example 1 0.12 part of glycerol-monoricinoleate is added to the polymerization batch prior to the beginning of the polymerization. At 54° C. the polymerization takes place very smoothly. The reaction heat produced in this case can be compensated without additional cooling by the heat radiation of the aggregate. After 16 hours 91% of a fine-grained polymer are obtained. A rolled film produced at 150° C. as described in Example 1 has still two fish eyes per 100 cm.$^2$.

*Example 3*

Vinyl chloride is polymerized at 54° C. as described in Example 1 but without the addition of an unsaturated glyceride. In the course of the polymerization it is necessary to switch on the cooling, especially in the critical range of conversion between 50 and 75%. After 16 hours 87 parts of a fine-grained polymer are obtained. A rolled film produced at 150° C. as described in Example 1 has 150 fish eyes per 100 cm.$^2$.

*Example 4*

0.12 part of glycerol-monostearate is added to the polymerization batch described in Example 1 instead of the unsaturated monoglyceride. The polymerization takes place at 54° C. in a very violent manner and the cooling must be switched on repeatedly as in Example 3. After 16 hours 90% of a fine-grained polymer are obtained. A rolled film prepared as described in Example 1 has 300 fish eyes per 100 cm.$^2$.

We claim:

1. A process for the manufacture of homopolymer of vinyl chloride with a high conversion rate, which process comprises adding to an aqueous suspension of vinyl chloride, in the presence of a water soluble suspension stabilizer selected from the group consisting essentially of gelatine, methyl cellulose, polyvinyl alcohol, and mixtures thereof, 0.01–1 percent, based on the vinyl chloride monomer present, of a monoester of glycerol and a nonconjugated olefinically unsaturated fatty acid containing 12–20 carbon atoms, said suspension agent and said monoester being the sole dispersants present in the suspension, and then homopolymerizing said vinyl chloride.

2. In the process of claim 1 the step which comprises adding glycerol-mono-oleate.

3. In the process of claim 1 the step which comprises adding glycerol-mono-ricinoleate.

References Cited in the file of this patent

UNITED STATES PATENTS

| | | |
|---|---|---|
| 2,528,469 | Condo et al. | Oct. 31, 1950 |
| 2,840,549 | McNulty et al. | June 24, 1958 |